(12) United States Patent
Smith

(10) Patent No.: US 12,333,454 B2
(45) Date of Patent: *Jun. 17, 2025

(54) SYSTEM AND METHOD OF DETERMINING REAL-TIME LOCATION

(71) Applicants: DENSO International America, Inc., Southfield, MI (US); DENSO CORPORATION, Kariya (JP)

(72) Inventor: Eric John Smith, Holland, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,108

(22) Filed: Nov. 7, 2022

(65) Prior Publication Data

US 2023/0060760 A1    Mar. 2, 2023

Related U.S. Application Data

(63) Continuation of application No. 16/545,542, filed on Aug. 20, 2019, now Pat. No. 11,494,707.

(60) Provisional application No. 62/871,441, filed on Jul. 8, 2019, provisional application No. 62/720,975, filed on Aug. 22, 2018.

(51) Int. Cl.
    *G06Q 10/02* (2012.01)
    *H04W 4/02* (2018.01)

(52) U.S. Cl.
    CPC ............ *G06Q 10/02* (2013.01); *H04W 4/023* (2013.01)

(58) Field of Classification Search
    CPC ........ G06Q 10/02; G06Q 10/00; G06Q 50/30; H04W 4/023; H04W 4/029; H04W 4/40
    See application file for complete search history.

(56) References Cited

U.S. PATENT DOCUMENTS

| 9,348,492 | B1 * | 5/2016 | Penilla | G06F 3/04842 |
| 10,311,661 | B2 | 6/2019 | Menard et al. | |
| 2013/0046808 | A1 | 2/2013 | Neill et al. | |
| 2013/0262873 | A1 * | 10/2013 | Read | H04L 63/0861 713/186 |
| 2015/0203125 | A1 * | 7/2015 | Penilla | G07C 5/0808 701/1 |
| 2015/0254581 | A1 | 9/2015 | Brahme | |

(Continued)

FOREIGN PATENT DOCUMENTS

JP    2003-173458    6/2003

OTHER PUBLICATIONS

RideMatcher: Peer-to-peer Matching of Passengers for Efficient Ridesharing Nicolae Vladimir Bozdog, Marc X. Makkes, Aart van Halteren, Henri Bal (Year: 2018).*

(Continued)

*Primary Examiner* — Alexandru Cirnu
(74) *Attorney, Agent, or Firm* — Warner Norcross + Judd LLP

(57) ABSTRACT

A system and method for determining location information of a portable device relative to an object is provided. In one embodiment, a booking control system is provided for booking a resource or service associated with the object. The system and method may determine location information with respect to the portable device, and identify the user as checked-in or checked-out (e.g., the resource is in-use or out of use) based on the location information.

18 Claims, 8 Drawing Sheets

(56) References Cited

U.S. PATENT DOCUMENTS

| | | | |
|---|---|---|---|
| 2016/0332535 A1* | 11/2016 | Bradley | G08B 21/24 |
| 2017/0153714 A1* | 6/2017 | Gao | G05D 1/0088 |
| 2017/0217445 A1* | 8/2017 | Tzirkel-Hancock | B60T 7/12 |
| 2017/0237820 A1 | 8/2017 | Scarborough et al. | |
| 2017/0303080 A1 | 10/2017 | Stitt et al. | |
| 2017/0303090 A1 | 10/2017 | Stitt et al. | |
| 2018/0184268 A1 | 6/2018 | Stitt et al. | |
| 2019/0094884 A1 | 3/2019 | Aitken | |
| 2020/0065722 A1 | 2/2020 | Smith | |

OTHER PUBLICATIONS

Bozdog, N.V. et al., "RideMatcher: Peer-to-peer Matching of Passengers for Efficient Ridesharing", 2018 18th IEEE/ACM International Symposium on Cluster, Cloud and Grid Computing, May 1, 2018, pp. 263-272.

* cited by examiner

SYSTEM AND METHOD OF DETERMINING REAL-TIME LOCATION

FIELD OF THE INVENTION

The present application relates to a system and method for determining location information with respect to a portable device and an object, such as a vehicle.

BACKGROUND

Real-time location or position determinations for objects have become increasingly prevalent across a wide spectrum of applications. Real-time locating systems (RTLS) are used and relied on for tracking objects, such as portable devices, in many realms including, for example, automotive, storage, retail, security access for authentication, and security access for authorization.

One conventional RTLS in the automotive realm includes a transceiver or master controller located within a vehicle and capable of communicating via radio frequency (RF) with a portable device. One or more aspects of the communications between the master controller and the portable device, such as signal strength of the communications, angle of arrival, time of flight, and/or others, may be monitored and used as a basis for determining a location of the portable device relative to the vehicle. For instance, if the signal strength of communications is low, the portable device may be farther away from the vehicle relative to communications where the signal strength is high. In general, the strength of communications drops off as the distance increases between the portable device and the vehicle. For instance, the angle of signals may be measured by one or more antennas, from which the position of the portable device may be determined using angulation (such as triangulation) or other techniques (which side of the antenna, machine learning, etc.). For instance, the time of flight of signals may be measured by one or more antennas, from which the distance of a portable device may be determined. In general, the time of flight increases as the distance increases between the portable device and the vehicle. Based on this or other measurements of a signal characteristic of communications, a location of the portable device may be determined.

SUMMARY

A system and method for determining location information of a portable device relative to an object is provided. In one embodiment, a booking control system is provided for booking a resource or service associated with the object. The system and method may determine location information with respect to the portable device, and identify the user as checked-in or checked-out (e.g., the resource is in-use or out of use) based on the location information.

A system for booking a user in one embodiment includes a fixed position device, a locator, and a booking control system. The fixed position device may be disposed in a fixed position relative to an object, and may include an antenna configured to communicate wirelessly with a portable device via a communication link.

The locator may be configured to determine location information about the portable device relative to the object, and to determine the location information based on a signal characteristic of communications wirelessly transmitted from the portable device. The booking control system may be configured to store a booking associated with the user, and to determine a status of the user is checked-in for the booking based on the location information being indicative that the user is at a first position relative to the object. The booking control system may be configured to determine the status of the user is checked-out for the booking based on the location information being indicative that the user is at a second position relative to the object.

In one embodiment, a system for generating an authorization for a user may include a booking control system, a fixed position device, and a locator. The booking control system may be configured to store a booking associated with the user, and to direct generation of the authorization for the user for the booking. The booking may be associated with at least one bookable event for which the authorization is generated.

The fixed position device may be disposed in a fixed position relative to an object, and may include an antenna configured to communicate wirelessly with a portable device via a communication link. The locator may be configured to determine location information about the portable device relative to the object, and to determine the location information based on a signal characteristic of communications wirelessly transmitted from the portable device.

In one embodiment, the booking control system may be configured to grant one or more rights to the user for said at least one bookable event based on said location information and said authorization.

In one embodiment, a method is provided for booking a resource of an object. The method may include reserving the resource for the user, wirelessly communicating with a portable device associated with the user via a communication link, and determining location information about the portable device, relative to the object, based on a signal characteristic of wireless communications of the communication link. The method may also include identifying the resource as being in-use by the user based on the location information being consistent with usage of the resource, and after identifying the resource as in-use, identifying the resource as not in in-use by the user based on the location information being consistent with the user having discontinued usage of the resource.

In one embodiment, the method may involve generating an authorization for the user with respect to the resource, and granting one or more rights to the user for the resource based on the authorization and the location information.

In one embodiment, the method may include determining a biometric parameter associated with the user.

In one embodiment, the method may communicating, via a telematics unit, occupancy information pertaining to the object. In one embodiment, a transmission rate of occupancy information may vary based on whether a resource of the object is in-use.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

A system and method for determining location information of a portable device relative to an object and controlling operation of an object based on the location information is provided.

I. System Overview

Figure 1:
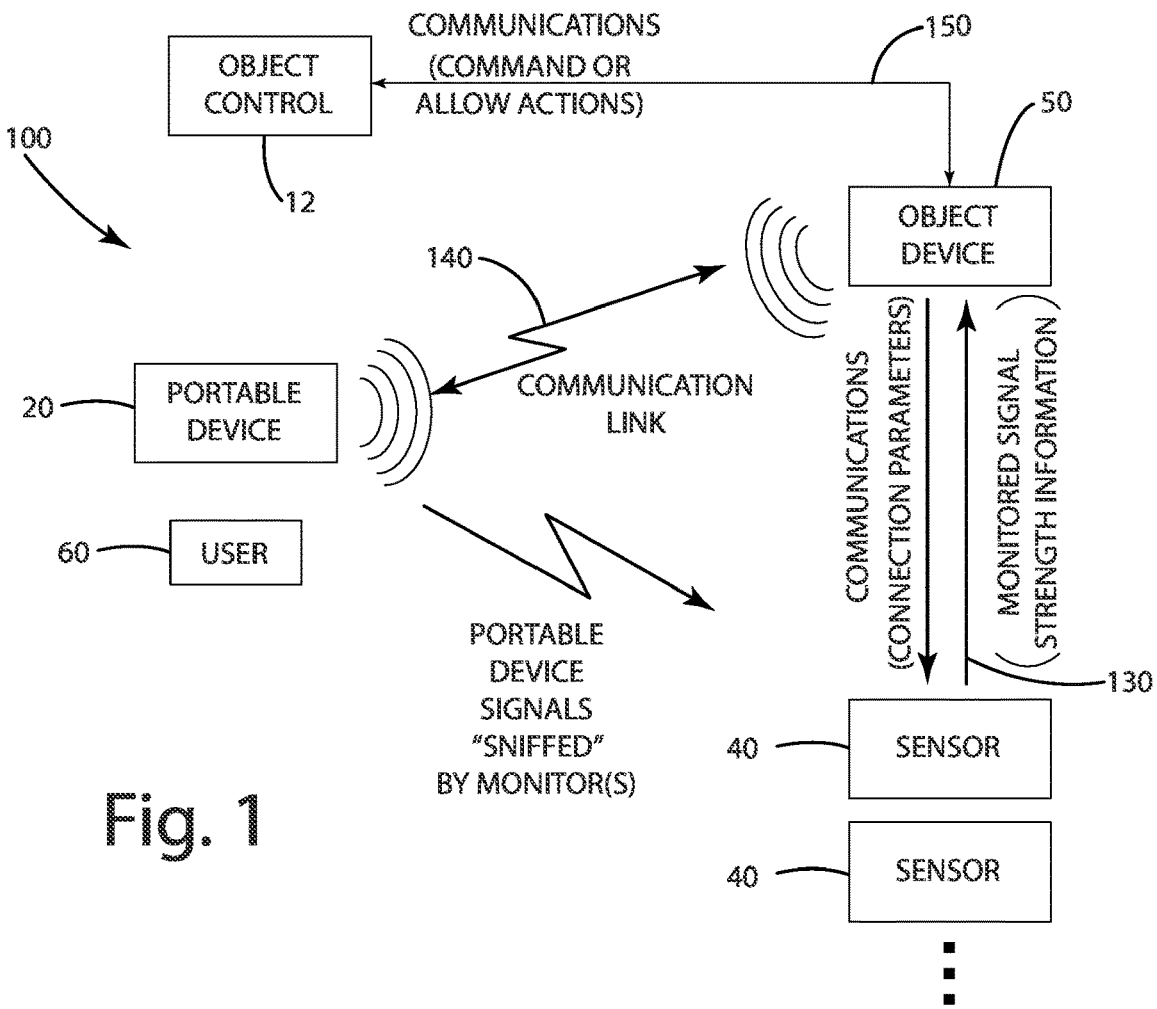
FIG. 1 shows a representative view of a system in accordance with one embodiment.
Figure 2:
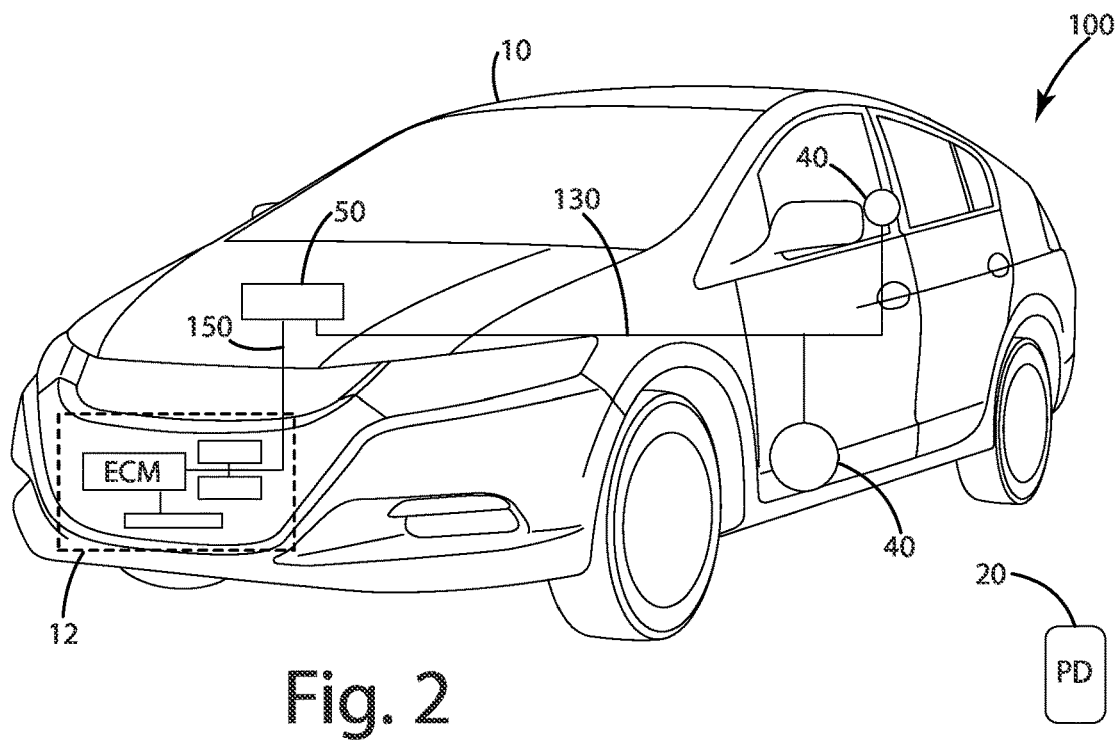
FIG. 2 depicts a representative view of the system in FIG. 1 disposed at least in part on an object.

A system in accordance with one embodiment is shown in the illustrated embodiment of FIGS. 1 and 2 and generally designated 100. The system 100 may include one or more system components as outlined herein. A system component may be a user 60 or an electronic system component, which may be the portable device 20, a sensor 40, or an object device 50, or a component including one or more aspects of these devices. The underlying components of the object device 50, as discussed herein, may be configured to operate in conjunction with any one or more of these devices. In this sense, in one embodiment, there may be several aspects or features common among the portable device 20, the sensor 40, and the object device 50. The features described in connection with the object device 50 depicted in FIG. 3 may be incorporated into the portable device 20, or the sensor 40, or both. In one embodiment, the object device 50 may form an equipment component disposed on an object 10, such as a vehicle or a building. The object device 50 may be communicatively coupled to one or more systems of the object 10 to control operation of the object 10, to transmit information to the one or more systems of the object 10, or to receive information from the one or more systems of the object 10, or a combination thereof. For instance, the object 10 may include an object controller 12 configured to control operation of the object 10. The object 10 may include one or more communication networks, wired or wireless, that facilitate communication between the object controller 12 and the object device 50. The communication network for facilitating communications between the object device 50 and the object controller 12 is designated 150 in the illustrated embodiment of FIG. 2 and provided as a CAN bus.

In one embodiment, the system may include a communication controller, such as a telematics control unit (not shown). For instance, the TCU (telematics control unit) may be connected to the object device 50 (via SPI). In another embodiment, the TCU may be combined with the object device 50. In another embodiment, the TCU may be part of the vehicle's object control 12, or connected to the vehicle's object control 12. In another embodiment, the TCU may be absent and data could be tunneled through the portable device (e.g., via BLE). "Tunneled" may be defined as a traditional tunnel—like running TCP/IP over BLE; however, the present disclosure is not so limited. The tunnel may be defined as a configuration that enables relevant data to be communicated to the object device 50 or other system components via commands/responses. The communication controller may be any type of control unit or system capable of facilitating communications. A communication controller may be provided in any component described herein, including the object or the portable device, or both.

In one embodiment, the TCU may include a cellular modem or other long range WAN radio (Lora, Sigfox, etc.).

In one embodiment, as described above, the TCU is not a required part of the system; for instance, all functionality of the TCU and the system it communicates with may be performed locally (not in the cloud).

Figure 3:
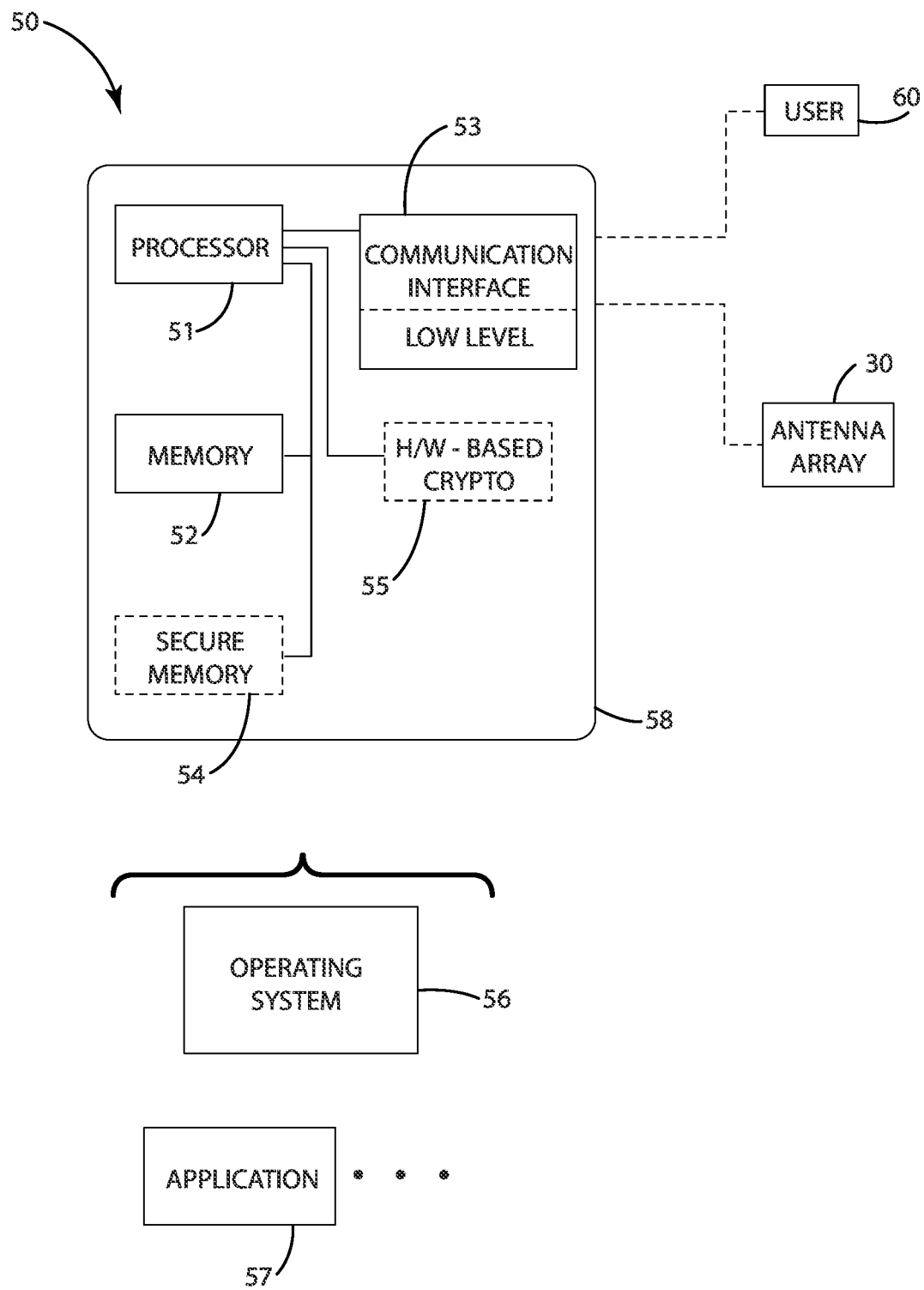
FIG. 3 shows a system component in accordance with one embodiment.

In the illustrated embodiment of FIG. 3, the object device 50 may include a control system or controller 58 configured to control operation of the object device 50 in accordance with the one or more functions and algorithms discussed herein, or aspects thereof. The system components, such as the portable device 20, or the sensor 40, or both, may similarly include a controller 58 configured to control operation or aspects of the respective system component.

The controller 58 includes any and all electrical circuitry and components to carry out the functions and algorithms described herein. Generally speaking, the controller 58 may include one or more microcontrollers, microprocessors, and/or other programmable electronics that are programmed to carry out the functions described herein. The controller 58 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the object device 50, or they may reside in a common location within the object device 50. When physically distributed, the components may communicate using any suitable serial or parallel communication protocol, such as, but not limited to: CAN, LIN, FireWire, I2C, RS-232, RS-422, RS-485, SPI, Ethernet, Universal Serial Bus (USB), and RF (cellular, WiFi, Bluetooth, Bluetooth Low Energy. As described herein, the terms locator, module, model, and generator designate parts of the controller 58. For instance, a model or locator in one embodiment is described as having one or more core functions and one or more parameters that affect output of the one or more core functions. Aspects of the model or locator may be stored in memory of the controller 58, and may also form part of the controller configuration such that the model is part of the controller 58 that is configured to operate to receive and translate one or more inputs and to output one or more outputs. Likewise, a module or a generator are parts of the controller 58 such that the controller 58 is configured to receive an input described in conjunction with a module or generator and provide an output corresponding to an algorithm associated with the module or generator.

The controller 58 of the object device 50 in the illustrated embodiment of FIG. 3 may include one or more processors 51 that execute one or more applications 57 (software and/or includes firmware), one or more memory units 52 (e.g., RAM and/or ROM), and one or more communication interfaces 53, amongst other electronic hardware. The object device 50 may or may not have an operating system 56 that controls access to lower-level devices/electronics via a communication interface 53. The object device 50 may or may not have hardware-based cryptography units 55—in their absence, cryptographic functions may be performed in software. The object device 50 may or may not have (or have access to) secure memory units 54 (e.g., a secure element or a hardware security module (HSM)). Optional components and communication paths are shown in phantom lines in the illustrated embodiment.

The controller 58 in the illustrated embodiment of FIG. 3 is not dependent upon the presence of a secure memory unit 54 in any component. In the optional absence of a secure memory unit 54, data that may otherwise be stored in the secure memory unit 54 (e.g., private and/or secret keys) may be encrypted at rest (when possible). Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface 53 may be any type of communication link, including any of the types of communication links describe herein, including wired or wireless. The communication interface 53 may facilitate external or internal, or both, communications. For instance, the communication interface 53 may be coupled to or incorporate the antenna array 30. The antenna array 30 may include one or more antennas configured to facilitate wireless communications, including BLE communications.

As another example, the communication interface 53 may provide a wireless communication link with another system component in the form of the portable device 20, such as wireless communications according to the WiFi standard. In another example, the communication interface 53 may be configured to communicate with an object controller 12 of a vehicle (e.g., a vehicle component) via a wired link such as a CAN-based wired network that facilitates communication between a plurality of devices. The communication interface 53 in one embodiment may include a display and/or input interface for communicating information to and/or receiving information from the user 60.

In one embodiment, the object device 50 may be configured to communicate with one or more auxiliary devices other than another object device 50 or a user. The auxiliary device may be configured differently from the object device 50—e.g., the auxiliary device may not include a processor 51, and instead, may include at least one direct connection and/or a communication interface for transmission or receipt, or both, of information with the object device 50. For instance, the auxiliary device may be a solenoid that accepts an input from the object device 50, or the auxiliary device may be a sensor (e.g., a proximity sensor) that provides analog and/or digital feedback to the object device 50.

The system 100 in the illustrated embodiment may be configured to determine location information in real-time with respect to the portable device 20. In the illustrated embodiment of FIG. 1, the user 60 may carry the portable device 20 (e.g., a smartphone). The system 100 may facilitate locating the portable device 20 with respect to the object 10 (e.g., a vehicle) in real-time with sufficient precision to determine whether the user 60 is located at a position at which access to the object 10 or permission for an object 10 command should be granted.

For instance, in an embodiment where the object 10 is a vehicle, the system 100 may facilitate determining whether the portable device 20 is outside the vehicle but in close proximity, such as within 5 feet, 3 feet, or 2 feet or less, to the driver-side door. This determination may form the basis for identifying whether the system 100 should unlock the vehicle. On the other hand, if the system 100 determines the portable device 20 is outside the vehicle and not in close proximity to the driver-side door (e.g., outside the range of 2 feet, 3 feet, or 5 feet), the system 100 may determine to lock the driver-side door. As another example, if the system 100 determines the portable device 20 is in close proximity to the driver-side seat but not in proximity to the passenger seat or the rear seat, the system 100 may determine to enable mobilization of the vehicle. Conversely, if the portable device 20 is determined to be outside close proximity to the driver-side seat, the system 100 may determine to immobilize or maintain immobilization of the vehicle.

The object 10 may include multiple object devices 50 or variant thereof, such as a sensor 40 coupled to an antenna array 30 in accordance with one or more embodiments described herein.

Micro-location of the portable device 20 may be determined in a variety of ways, such as using information obtained from a global positioning system, one or more signal characteristics of communications from the portable device 20, and one or more sensors (e.g., a proximity sensor, a limit switch, or a visual sensor), or a combination thereof. An example of microlocation techniques for which the system 100 can be configured are disclosed in U.S. Nonprovisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

In one embodiment, in the illustrated embodiment of FIG. 2, the object device 50 (e.g., a system control module (SCM)) and a plurality of sensors 40 (coupled to an antenna array 30) may be disposed on or in a fixed position relative to the object 10. Example use cases of the object 10 include the vehicle identified in the prior example, or a building for which access is controlled by the object device 50.

The portable device 20 may communicate wirelessly with the object device 50 via a communication link 140. The plurality of sensors 40 may be configured to sniff the communications between the portable device 20 and the object device 50 to determine one or more signal characteristics of the communications, such as signal strength, angle of arrival, time of flight, or any combination thereof. In an alternative embodiment, the portable device 20 may establish communications with another device other than the object device 50, but at least one of the object device 50 and the one or more sensors 40 may be configured to sniff these communications to determine a location of the respective device relative to the object 10.

The communication link 140 in the illustrated embodiment is a Bluetooth Low Energy (BTLE) communication link. However, the present disclosure is not so limited. For example, the communication link 140 may not be BTLE; it may be wired or wireless and established according to any protocol, including UltraWideband (UWB) instead of BTLE. As another example, the communication link 140 may include more than one type of communication link; e.g., the communication link 140 may be established according to both BTLE and UltraWide Band.

The determined signal characteristics may be communicated or analyzed and then communicated to the object device 50 via a communication link 140 separate from the communication link between the portable device 20 and the object device 50. Additionally, or alternatively, the portable device 20 may establish a direct communication link with one or more of the sensors 40, and the one or more signal characteristics may be determined based on this direct communication link.

As described herein, one or more signal characteristics, such as signal strength, time of flight, and angle of arrival, may be analyzed to determine location information about the portable device 20 relative to the object 10, an aspect of the object 10, or the object device 50, or a combination thereof. For instance, time difference of arrival or the angle of arrival, or both, among the sensors 40 and the object device 50 may be processed to determine a relative position of the portable device 20. The positions of the one or more antenna arrays 30 relative to the object device 50 may be known so that the relative position of the portable device 20 can be translated to an absolute position with respect to the antenna arrays 30 and the object device 50.

Additional or alternative examples of signal characteristics may be obtained to facilitate determining position according to one or more algorithms, including a distance function, trilateration function, a triangulation function, a multilateration function, a fingerprinting function, a differential function, a time of flight function, a time of arrival function, a time difference of arrival function, an angle of departure function, a geometric function, etc., or any combination thereof.

II. Locator

Figure 4:
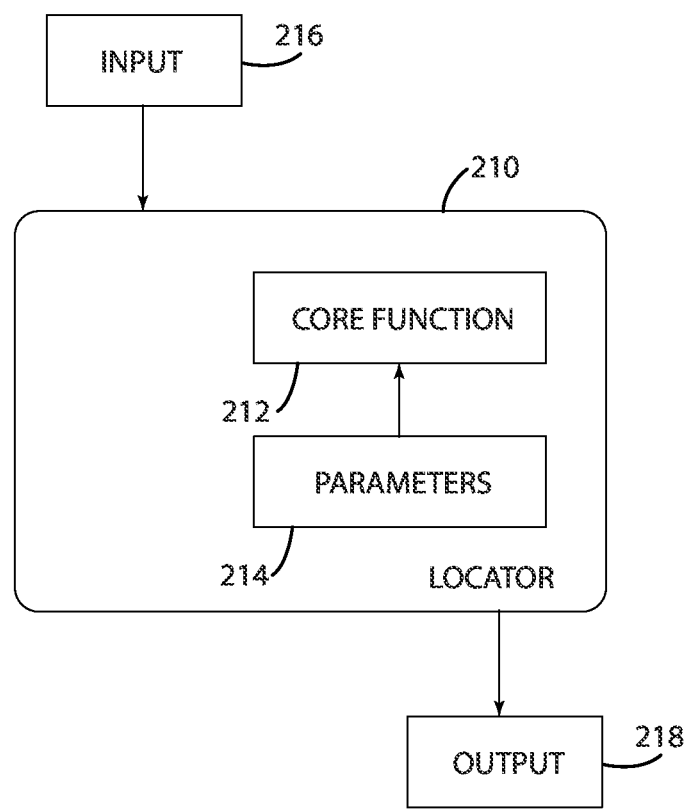
FIG. 4 shows a locator of the system in accordance with one embodiment.

The system 100 in the illustrated embodiment of FIGS. 1-3 may be configured to determine location information about the portable device 20 relative to the object 10. The location information may be indicative of an exterior location of the portable device 20 relative to the object 10, or the location information may be indicative of an interior location of the portable device 20 within the object 10, or a combination thereof. In one embodiment, a locator may be configured to determine this location information. A locator in accordance with one embodiment is depicted in FIG. 4 and generally designated 210. The locator 210 may be configured to receive one or more inputs 216, such as one or more signal characteristics of wireless communications transmitted by the portable device 20 and received by one or more sensors 40. The inputs may be translated to one or more outputs 218 corresponding to the location information.

It should be understood that the inputs 216 are not limited to signal characteristics of wireless communications. The inputs 216 may include one or more measurements of characteristics or parameters other than wireless communications. Additionally, or alternatively, the inputs 216 may be indicative of a state of the object 10 or another device in the system 100. For instance, in the context of a vehicle, one or more of the inputs 216 may indicate that one or more of the vehicle doors are open or closed, or whether a window is open or closed.

The locator 210 in the illustrated embodiment may be incorporated into the object device 50. For instance, the controller 58 of the object device 50 may incorporate the locator 210, and be communicatively coupled to one or more of the sensors 40 via the communication interface 53.

The locator 210 may include a core function or locator algorithm 212 that is configured to receive the one or more inputs 216 and to generate the one or more outputs 218 indicative of a location of the portable device 20 relative to the object 10. As discussed herein, the one or more inputs 216 may vary from application to application. Examples of inputs 216 include one or more signal characteristics of the communications, such as signal strength (RSSI), angle of arrival (AOA), and time of flight (TOF).

Figure 5:
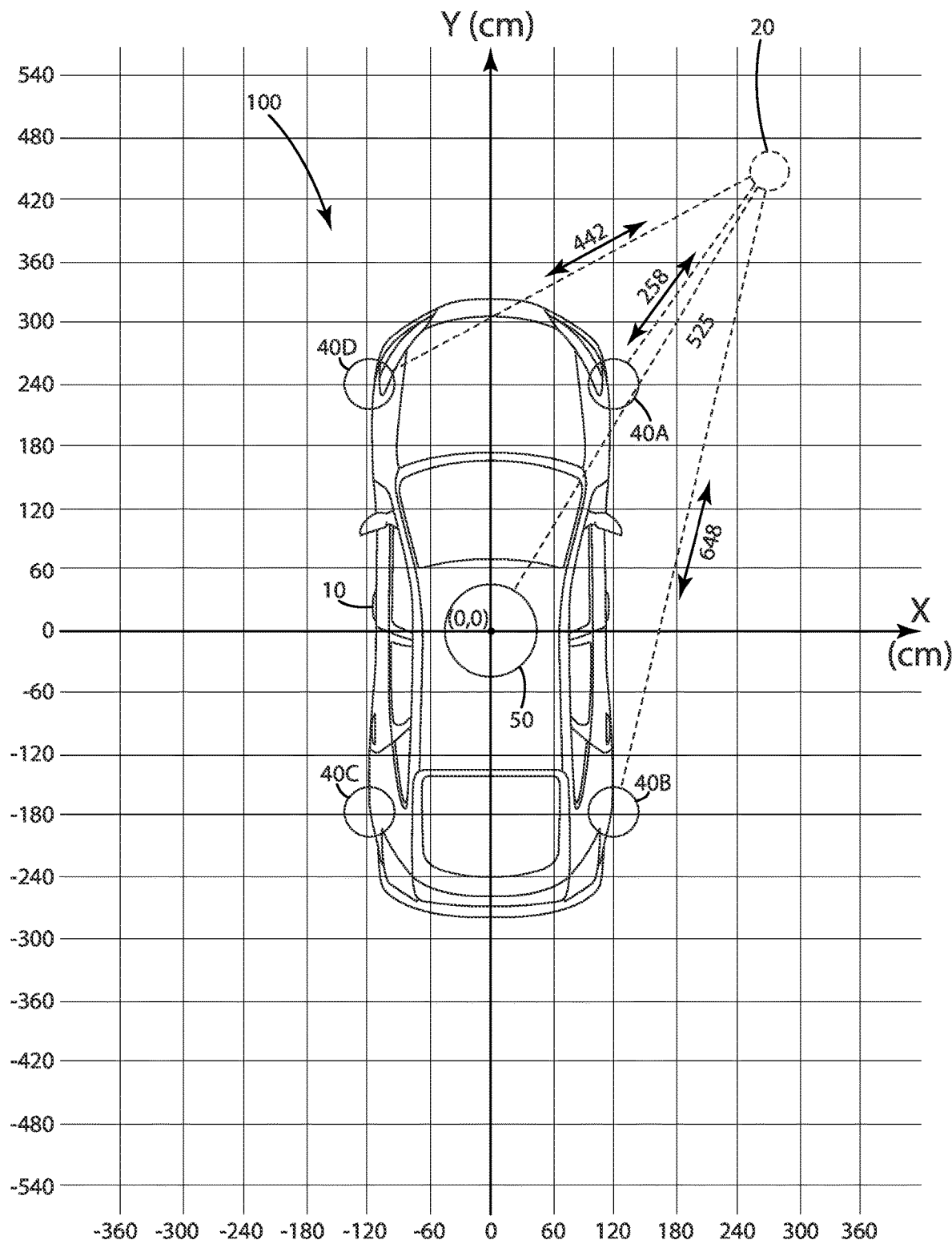
FIG. 5 shows a system in accordance with one embodiment.

In the illustrated embodiment of FIG. 5, the system 100 is provided in conjunction with an object 10 that is a vehicle. The object 10 may be different in other applications. The system 100 in the illustrated embodiment includes an object device 50 and a plurality of sensors 40A-D disposed in a fixed position on the object 10, such that these devices comprise fixed position devices. The locations of the sensors 40A-D and the object device 50 may vary from application to application; however, for purposes of disclosure the object device 50 is disposed generally in a center of the vehicle and the sensors 40A-D are disposed at the four corners of the vehicle. A grid is shown in the illustrated embodiment to facilitate discussion in conjunction with the locator 210.

In the illustrated embodiment of FIG. 5, the portable device 20 is disposed at X, Y coordinates 270 cm, 450 cm relative to the origin (0 cm, 0 cm) provided at the center of the object 10. The sensors 40A, 40B, 40D are respectively positioned at 258 cm, 648 cm, and 442 cm relative to the portable device 20. In one embodiment, a signal characteristic of communications (e.g., RSSI) transmitted from the portable device 20 and received by each of the sensors 40A, 40B, 40D and the object device 50 may be translated by the locator 210 to a distance or location relative to each respective sensor 40A, 40B, 40D. (Sensor 40C is shown and left out of this determination in the illustrated embodiment because a portion of the vehicle obstructs the line of sight between the portable device 20 and the sensor 40C, potentially preventing a valid measurement of a signal characteristic of communications.)

The locator 210 in one embodiment may translate the signal characteristic obtained from a sensor 40 or the object device 50 to a distance metric or other parameter in a variety of ways, including, for instance, a translation table for each fixed position device or type of fixed position devices, fingerprinting or other heuristic (e.g., a machine learned translator). An example of a translation table is shown in chart form in the illustrated embodiment of FIG. 6 and generally designated 600.

Figure 6:
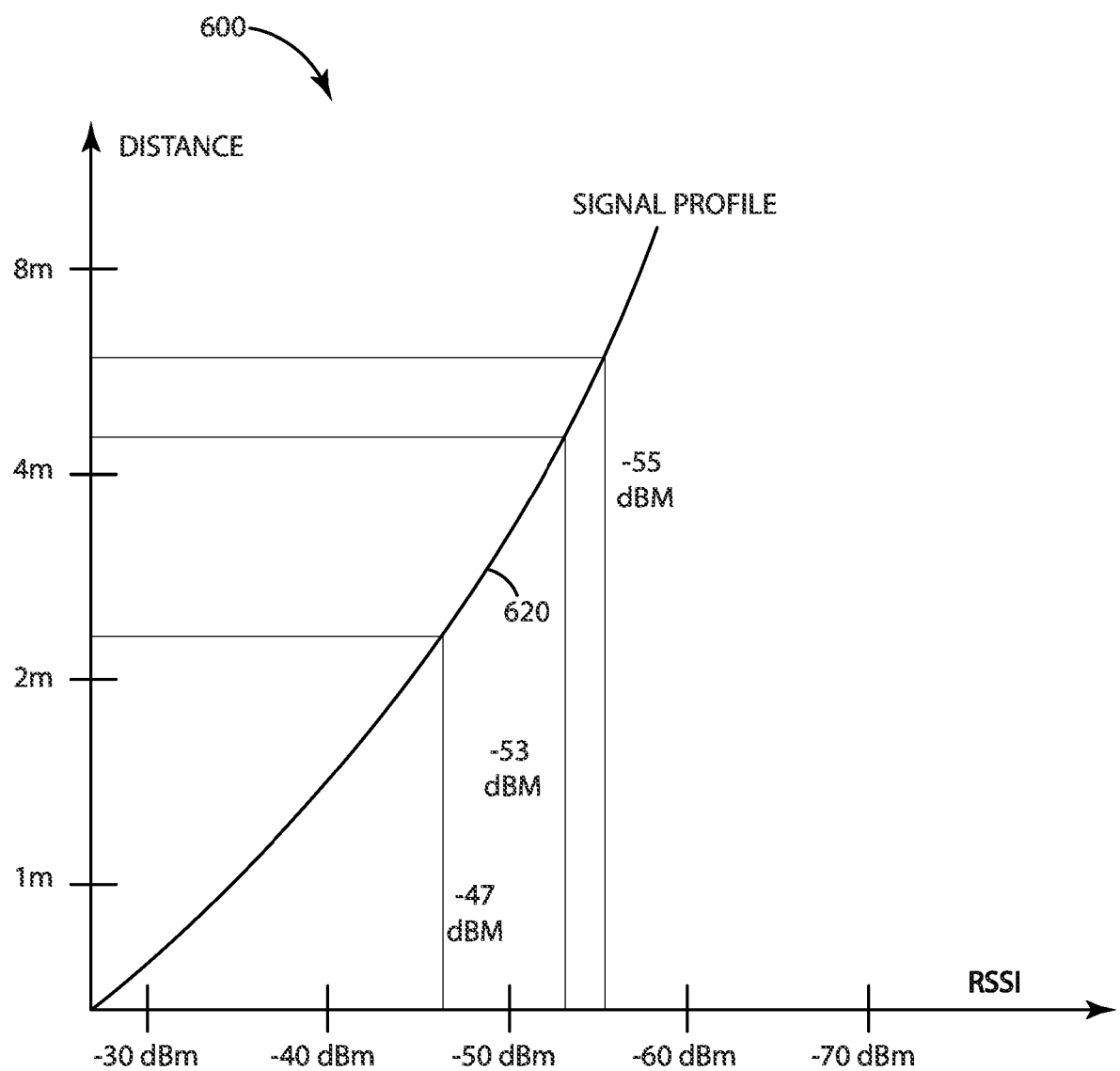
FIG. 6 shows a representative view of a signal characteristic pertaining to one or more devices disposed at different locations in accordance with one embodiment.

In the illustrated embodiment of FIG. 6, the translation table 620 is operable to translate RSSI to a distance for each of the sensors 40A, 40B, 40D. Returning to the illustrated embodiment of FIG. 6, measurements of RSSI for the sensors 40A, 40B, 40D correspond generally and respectively to −47 dBm, −53 dBm, and −55 dBm. These RSSI measurements for each sensor 40A, 40B, 40D may be translated directly to distance measurements based on the translation table 620; alternatively, the locator 210 may utilize the RSSI measurement to represent distance in further calculations to determine the position of the portable device 20 relative to the object 10.

In the illustrated embodiment, with the three distances determined relative to each of the sensors 40A, 40B, 40D based on the outdoor translation table 620, the locator 210 may determine a location of the portable device by trilateration of the three distances given known positions of the sensors 40A, 40B, 40D. It should be noted that the present disclosure is not limited to trilateration as part of the locator algorithm 212; a variety of additional or alternative functions may form part of the locator algorithm 212, as discussed herein, including a distance function, a triangulation function, a multilateration function, a fingerprinting function, a differential function, a time of flight function, a time of arrival function, a time difference of arrival function, an angle of departure function, a geometric function, etc., or any combination thereof.

The locator algorithm 212 of the locator 210 may be tunable according to a plurality of parameters 214 of the locator 210. Based on the one or more inputs and the values of the plurality of parameters 214, the locator algorithm 212 may provide an output indicative of a location of the portable device 20 relative to the object 10. The locator algorithm 212 may vary from application to application.

In one example, the locator algorithm 212 may be a neural network (e.g., a convolutional neural network with one or more layers), and the one or more parameters may include weights of nodes within the neural network. The weights may be adjusted during training of the locator 210 with samples obtained from a portable device 20 and the object 10 and truth information obtained with respect to the samples.

In a vehicle, there may be many antennas in accordance with one embodiment of the system 100, where each of the antennas may be in a different location with a different orientation. All or a subset of the antennas and associated devices, such as the object device 50 or the sensor 40, may obtain RSSI, angle of arrival, time of flight, or other, or any combination thereof, measurements simultaneously.

Because a variety of factors can affect one or more signal characteristics of communications between the receiver and transmitter, to facilitate tuning the locator 210 and the locator algorithm 212, samples may be obtained for the one or more signal characteristics under a variety of conditions.

Example variations in conditions can include purposefully rotating the portable device 20 in all directions, as well as obtaining test samples at different heights to ground, to force testing or obtaining samples to cover a large percentage of all possible angles/orientations.

III. Method of Booking

A method of booking an asset (e.g., an object 10) based on location information is provided. The booking method may include generating one or more messages, such as user notifications, generated in response to the location information satisfying one or more criteria. Additionally, or alternatively, the one or more messages may be communications transmitted to another device in response to the location information satisfying the one or more criteria.

In one embodiment, the system described in conjunction with the illustrated embodiments of FIGS. 1-6 may form a localization service or a localization system 100 that provides information to or communicates with a secondary system 200 to enhance operation of the secondary system. Together, the localization system and the secondary system 200 may form a system 300 (e.g., a messaging system) shown in the illustrated embodiment of FIG. 7.

The secondary system 200 in one embodiment is a booking service or booking control system, such as for a ride sharing service, an autonomous taxi, or other automotive services, or other non-automotive services, such as rental properties, office spaces, office desks, and so on (anything where a service provider would want to interact with customers based upon their presence and booking state of a service [booked, not booked, wrong booking, etc.]). The localization service in one embodiment may enhance system performance, operation, and/or user experience of the secondary system 200.

Figure 7:
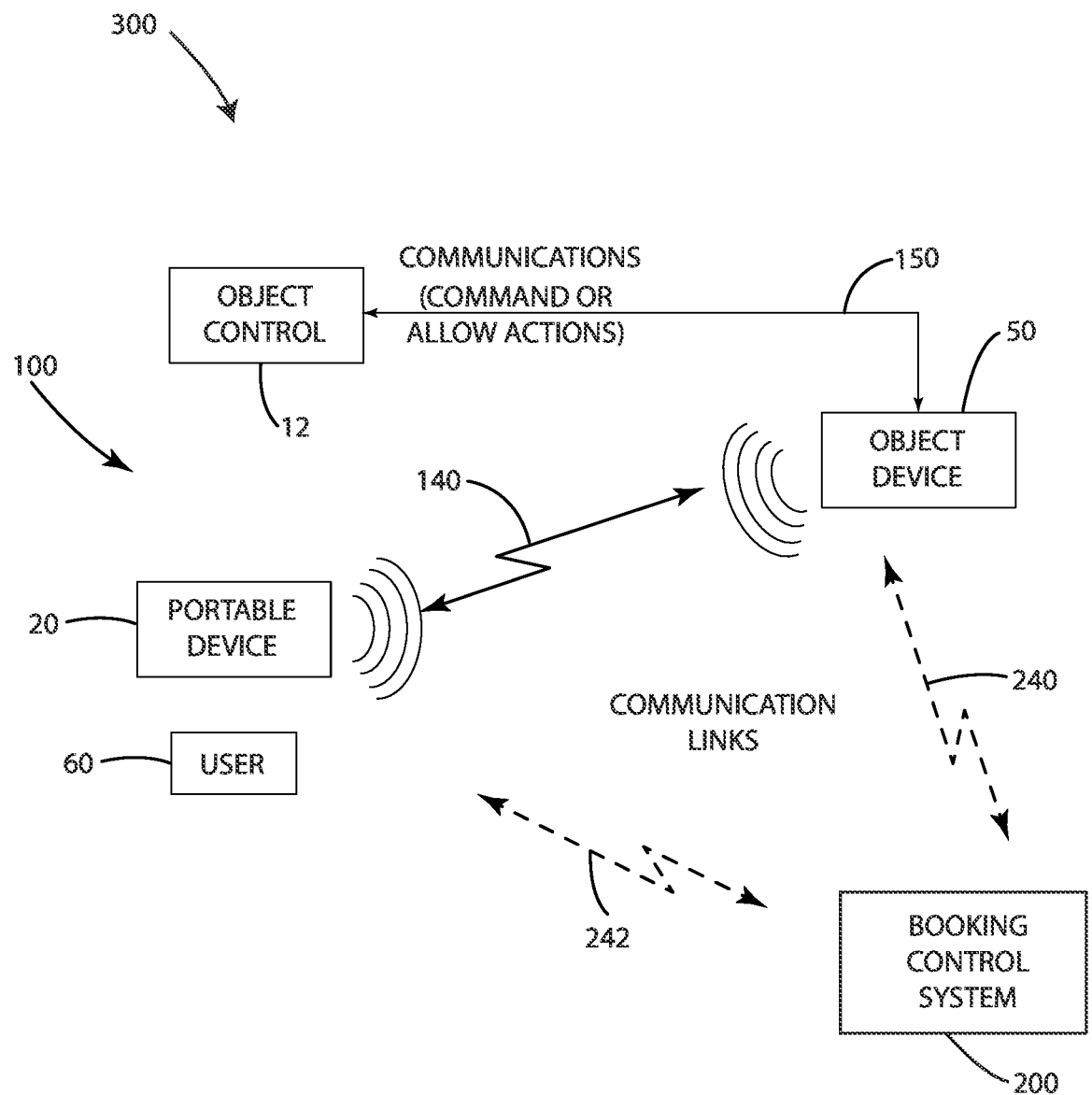
FIG. 7 shows a system in accordance with one embodiment.

The secondary system 200 may be capable of communicating with at least one of the portable device 20, the object device 50 and the object control system 12. For instance, first and second booking system communication links 240, 242 are shown in FIG. 7, with the first booking system communication link 240 providing communication capabilities between the secondary system 200 and the object device 50, and with the second booking system communication link 242 providing communication capabilities between the portable device 20 and the secondary system 200. The first and second booking system communication links 240, 242 are depicted as wireless links similar to wireless configurations of the communication link 140 described herein; however, the present disclosure is not so limited. The first and second booking system communication links 240, 242 may be any type of communication link, similar to the alternative embodiments described in conjunction with the communication link 140, and including BTLE, Cellular, UWB, and wired connections. For instance, the booking control system 200 in one embodiment may be integrated, at least partially, into the object 10 and may communicated with the object device 50 via a wired form of the first communication link 240. In this example, the booking control system 200 may be distributed between components disposed on the object 10, and components disposed remotely, such as a networked server capable of managing services for multiple objects 10. The communication link between components of the booking control system 200 may be established in a variety of ways, including a telematics unit as described herein.

The booking control system or secondary system 200 may be constructed with components similar to those described in conjunction with the object device 50. As discussed herein, the secondary system 200 may be distributed over one or more objects, such as the object 10 and a server system disposed remotely from the object 10.

In one embodiment, the secondary system 200 may be a ride sharing control system or booking control system, where users may obtain a ride from point A to point C. The ride may occur immediately or at any point in the future. As part of the process to obtain the ride, the user may need to navigate to point A (where the user is supposed to get on [embark/board] the ride); the user will then be transported from point A to point C (where the user is supposed to get off [disembark/depart] the ride). The ride from point A to point C may include any number of points between A and C (e.g., A→B0→B1→C). The ride may have a "stop" at each point (e.g., the ride may stop at each point to potentially pickup or drop off users). That is, the ride may follow the following sequence in one embodiment: Stop A→Stop B0→Stop B1→ . . . →Stop C.

A route may define an ordered collection of points and/or stops (e.g., the sequence of stops a particular vehicle travels for that route). Routes may be scheduled to run (e.g., execute) many times (e.g., many times each day), scheduled for as long into the future as desired (e.g., driver A will take vehicle X and drive route R at 10:15 a.m., 10:30 a.m., 10:45 a.m., etc.). Vehicles and drivers may be assigned to schedules at creation or later. Each of these schedules (i.e., an instance for a particular route [e.g., a route starting at a particular time]) may have its own set of bookable stops that users may independently book (e.g., at 10:30 a.m. tomorrow, user U wants to go from stop A to stop C; accordingly, the user would book bookable stop A and bookable stop B for the 10:30 a.m. schedule tomorrow for route R).

A booking may define a starting bookable stop and an ending bookable stop for a particular user (e.g., user U has a "booking" at 10:30 a.m. from stop A to stop C). Alternatively, the booking may define a full (or partial) sequence of bookable stops (e.g., user U has a "booking" at 10:30 a.m. from stop A, then stop B0, then stop B1, and finally, stop C).

Vehicles have limited capacity (seating) and thus the secondary system 200 may track the number of users that have booked each bookable stop to ensure the capacity is not exceeded (with or without spares); as a result, using the route associated with the schedule, the secondary system may book the user for each bookable stop in accordance with the user's booking (e.g., if the route is A→B0→B1→C, and the booking is for A to C, the secondary system may book the user at stops A, B0, and B1 [not C, because the user is departing at C]).

Users may be checked-in or checked-out to/from each bookable stop along the route. Being checked-in for a particular bookable stop may imply that the user is in the vehicle (e.g., using the service). Being checked-out for a particular bookable stop may imply that the user is not in the vehicle (e.g., is no longer using the service). Alternately, being checked-out for a particular bookable stop may imply that the user is not in the vehicle, but was previously in the vehicle (e.g., was using the service, but is no longer using the service). The system 200 may separately track status for checked-in and status for checked-out, along with other meta-data (such as timestamps or other data). Alternatively, the system 200 may combine them into a single boolean value (either they are checked-in or they are not), or any combination thereof.

In one embodiment of the system 200, the bookable stops of the booking may reside within the same schedule; however, in alternative system, users may be able to create bookings that span multiple schedules (e.g., someone who wants to ride on the same route multiple times in a row). Alternatively or additionally, in one system, a schedule may include multiple routes (and thus, the corresponding bookable stops from the combination of routes).

The system 200 may be adapted for use with a ride sharing service, booking service, and other services in other automotive services (e.g., rentals, taxi services, mass transit, etc.) and other industries (building or service access, office utilization, etc.). Accordingly, the secondary system 200 and a system 300 with the localization system 100 and the secondary system 200 is not limited to a ride sharing service; the secondary system 200 may be any type of booking system for any type of asset or any access controlled system for any type of asset.

It should be understood that check-in/check-out states can be tracked additionally or alternatively at the booking level rather than at each stop.

Figure 8:
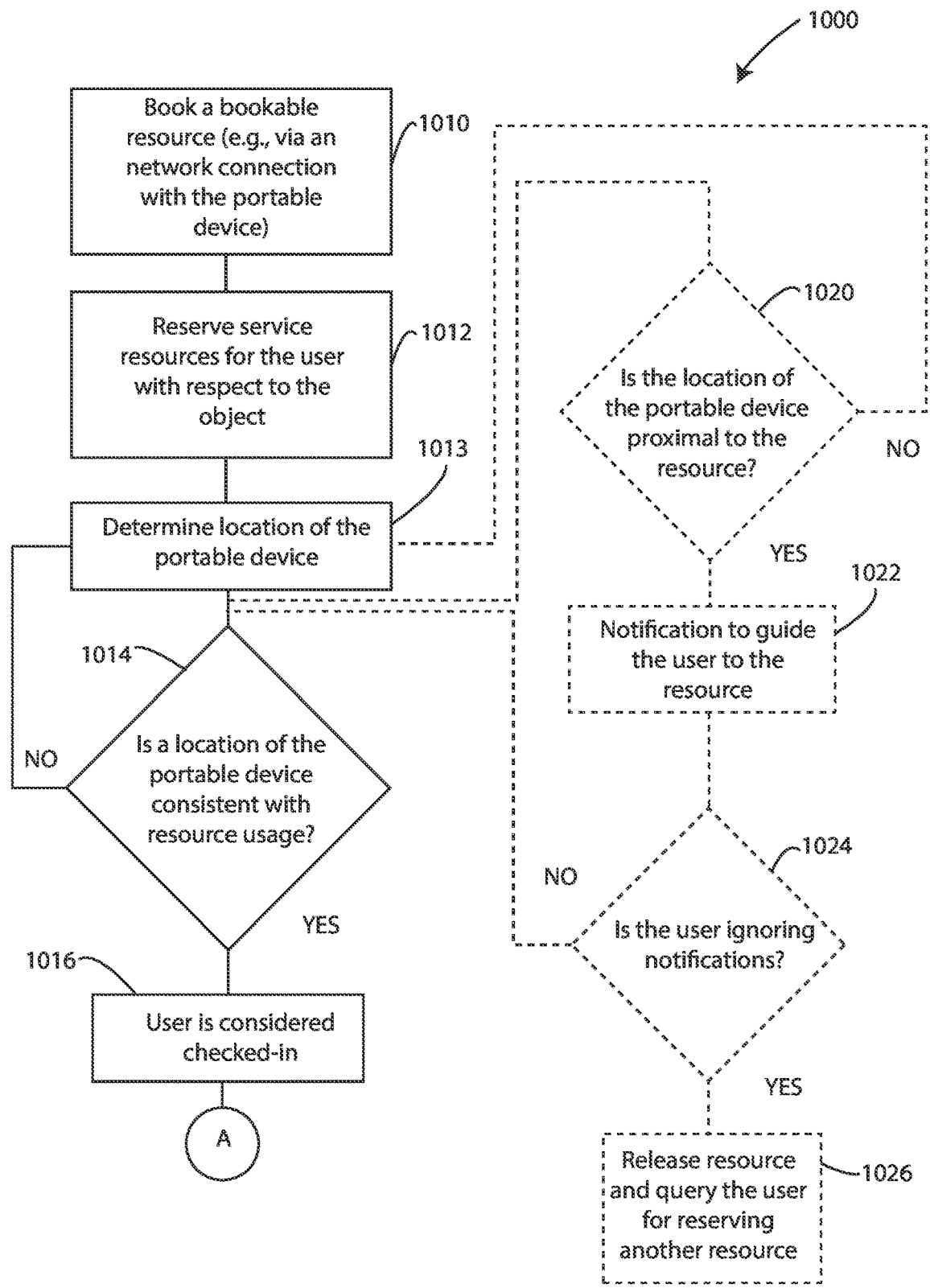
FIG. 8 shows a method in accordance with one embodiment.

A method of operation for the booking control system or secondary system 200 is provided in the illustrated embodiment of FIG. 8, and generally designated 1000. In the illustrated embodiment, the user may interact with the secondary system 200 to book a bookable resource (e.g., a service described herein, such as a ride with a ridesharing vehicle) of the object 10, also described herein as an asset. Step 1010. The user may communicate with the secondary system 200 via a network connection (e.g., the Internet) established with the portable device 20. It is to be understood that the user may book the bookable resource in other ways, and that the user, herself, may not actually book the bookable resource. A proxy (e.g., a personal assistant or an automated system) may book the bookable resource for the user. The secondary system 200 may reserve the bookable resource of the object 10 for use by the user and associate the bookable resource with the user's portable device 20. Step 1012.

A. Check-In

In one embodiment, with a bookable resource being reserved, the location system 100 may be utilized to determine location information about the portable device 20 associated with the user. If the location information for the portable device 20 is consistent with steps to initiate usage of the bookable resource of the asset, the user may be considered checked-in or that the resource is in-use by the user. Step 1016.

In one embodiment, check-in for an asset (e.g., a vehicle) may be established based on output from the localization system 100. Check-in may be conducted automatically. For instance, in one embodiment, automatic check-in may be conducted in accordance with the following steps: when a user has booked a particular service (e.g., stop A to stop B with a ride sharing service, renting a car or hotel room or house from time X to Y, etc.) and the user is in an appropriate absolute location (e.g., a particular geographical location) and/or location relative to the object 10 (e.g., inside the vehicle, inside the home or room, at the pickup stop, etc.), the user may be automatically checked-in to the booking (e.g., the user is in the vehicle [using the service]), at a particular location (e.g., the user got into a vehicle at the stop they booked).

Depending on the secondary service, the user may be able to be checked-in based on location—e.g., if a user is inside a vehicle that the user has booked, the user may be checked-in; but if the user is outside the vehicle, the user may not be checked-in, or the user may be checked-out if the user was previously checked-in, provided other system constraints are satisfied (the vehicle has not left the current stop, the current booking is still valid, etc.). As an example, the user may get on and then get off, or get off at the wrong time, or get on at the wrong time; the system may be configured to track check-in and check-out based on the location of the user, the location of the asset, and the booking associated with the user.

In one embodiment, the users' phones may be turned off, purposefully or as a result of battery drain, applications may crash, or other things may occur that may cause the localization system 100 to no longer detect the user (user's device). As a result, the system 200 may keep the user checked-in until the system 200 determines the user is detected in a particular location (e.g., outside to check-out), even if they are no longer detected. Additionally, the system 200 may disallow check-in based upon the physical state of the object—e.g., a user may not be checked-in while the vehicle is moving. When a user is checked-in to a particular bookable stop, the system 200 may check them into all remaining bookable stops in the booking, or alternatively, the system 200 may update the check-in status of each bookable stop as each stop is reached or departed.

B. Check-Out

In one embodiment, after check-in, location information with respect to the portable device 10 may be obtained from the localization system 100. The system 200 may determine whether usage of the booked service or allocated resource is complete (e.g., that the resource is no longer in-use by the user). Step 1015. For instance, the system 200 may determine that a vehicle has reached a destination stop associated with the booked service. The user in this example may exit the vehicle along with the portable device 20. Based on the location information being inconsistent with usage of the bookable resource of the asset or object 10, the system 200 may consider the user checked-out with respect to the bookable resource. Steps 1017, 1018, 1019.

In one embodiment, check-out for an asset may be established based on output from the localization system 100. Check-out may be conducted automatically. For instance, in one embodiment, automatic check-out may be conducted in accordance with the following steps: when a user has booked a particular service (e.g., stop A to stop B with a ride sharing service, renting a car or hotel room or house from time X to Y, etc.) and the user is in an appropriate absolute location (e.g., a particular geographical location) and/or location relative to the object (e.g., outside the vehicle, outside the home or room, at the drop-off stop, etc.), the user may be automatically checked-out of the booking (e.g., the user is out of the vehicle [no longer using the service]), at a particular location (e.g., the user exited the vehicle at the stop they booked).

Depending on the secondary service, a user may be checked-out based on location—e.g., if a user is outside a vehicle the user has booked, the user may be checked-out. But if the user is inside the vehicle, the user may not be checked-out, or the user may be checked-in if the user were previously checked-out, provided other system constraints are satisfied (e.g., the vehicle has not left the current stop, the current booking is still valid, etc.). For instance, a user may get off and then get on, or get off at the wrong time, or get on at the wrong time.

As mentioned in connection with check-in, users' phones may be turned off, purposefully or as a result of battery drain, applications may crash, or other things may occur that may cause the localization system to no longer detect the user (user's device). As a result, in one embodiment, the system may check-out the user, if the system does not detect the user at the end (destination stop) of their booking (e.g., the user is not detected at the final stop of their booking). The system may keep the user checked-out until the system determines the user is detected in a particular location (e.g., inside to check-in), even if they are no longer detected. Additionally, the system may disallow check-out based upon the physical state of the object—e.g., a user may not be checked-out while the vehicle is moving. When a user is checked-out of a particular bookable stop, the system may check them out of all remaining bookable stops in the booking, or alternatively, the system may update the check-out status of each bookable stop as each stop is reached or departed. In an alternate embodiment, the system may check-out a user if the user's mobile device is no longer detected.

C. Vehicle is Nearby

In one embodiment, shown as optional in the illustrated embodiment of FIG. 8 in phantom lines, the system 200 may provide assistance in directing the user to the bookable resource. If location information about the portable device 20 is consistent with the user being close to the bookable resource but not using the bookable resource (e.g., close to the vehicle but not in the vehicle or directly proximal to the vehicle), the system 200 may provide a notification to the user to facilitate directing the user to the bookable resource. Steps 1020, 1022.

In one embodiment, there may be many vehicles nearby the portable device 20 and the user, making it potentially difficult for a user, himself, to distinguish between a set of vehicles and determine which vehicle is the correct vehicle. By using knowledge of the user's booking and location of the user relative to the vehicle (the object 10) (e.g., that the user is not inside the vehicle, or that the user is near the passenger side of the vehicle, etc.) and/or an absolute location (e.g., that the vehicle is at the stop and that the vehicle is near the user's current geographical location), along with the state of the vehicle, the system 200 may direct the user to the appropriate vehicle and/or inform the user that the target vehicle is near. Additionally, or alternatively, the system may provide at minimum an indication to the user that the vehicle the user is standing near is or is not the appropriate vehicle. This sort of notification may differ from a conventional cloud system that may be aware of the absolute geographical location of the user and/or the vehicle, and that correlates the vehicle and the user. The system in accordance with one embodiment of the present disclosure may be much more precise and responsive to scale. For instance, the system may detect that the user is near the door of vehicle X instead of vehicle Y, despite both vehicle X and Y being in nearly the same geographical location as determined by GPS or similar.

D. User is not Entering Vehicle

In one embodiment, there are some cases where users may be distracted at their pickup location and not enter the vehicle—or a user may purposefully not enter the vehicle, desiring, for example, to book a different vehicle (service) than originally booked. By using knowledge of the user's booking and location of the user relative to the object (e.g., that the user is not inside the vehicle) and/or absolute location (e.g., that the vehicle is at the stop and that the vehicle is near the user's current geographical location), along with the state of the vehicle, the system 200 may notify the user that their ride has arrived at the pickup location and that the user should enter the vehicle. The system 200 may continually notify the user until they have entered the vehicle (or until the vehicle has left the stop). The system may offer the user to book a different vehicle (service) if the user is determined to be ignoring the notifications (e.g., there is has been no entry after a period of time or after a threshold number of notifications, or after an active dismissal of a notification followed by non-entry, or any combination thereof). Steps 1024, 1026.

E. User is not Exiting Vehicle

Figure 9:
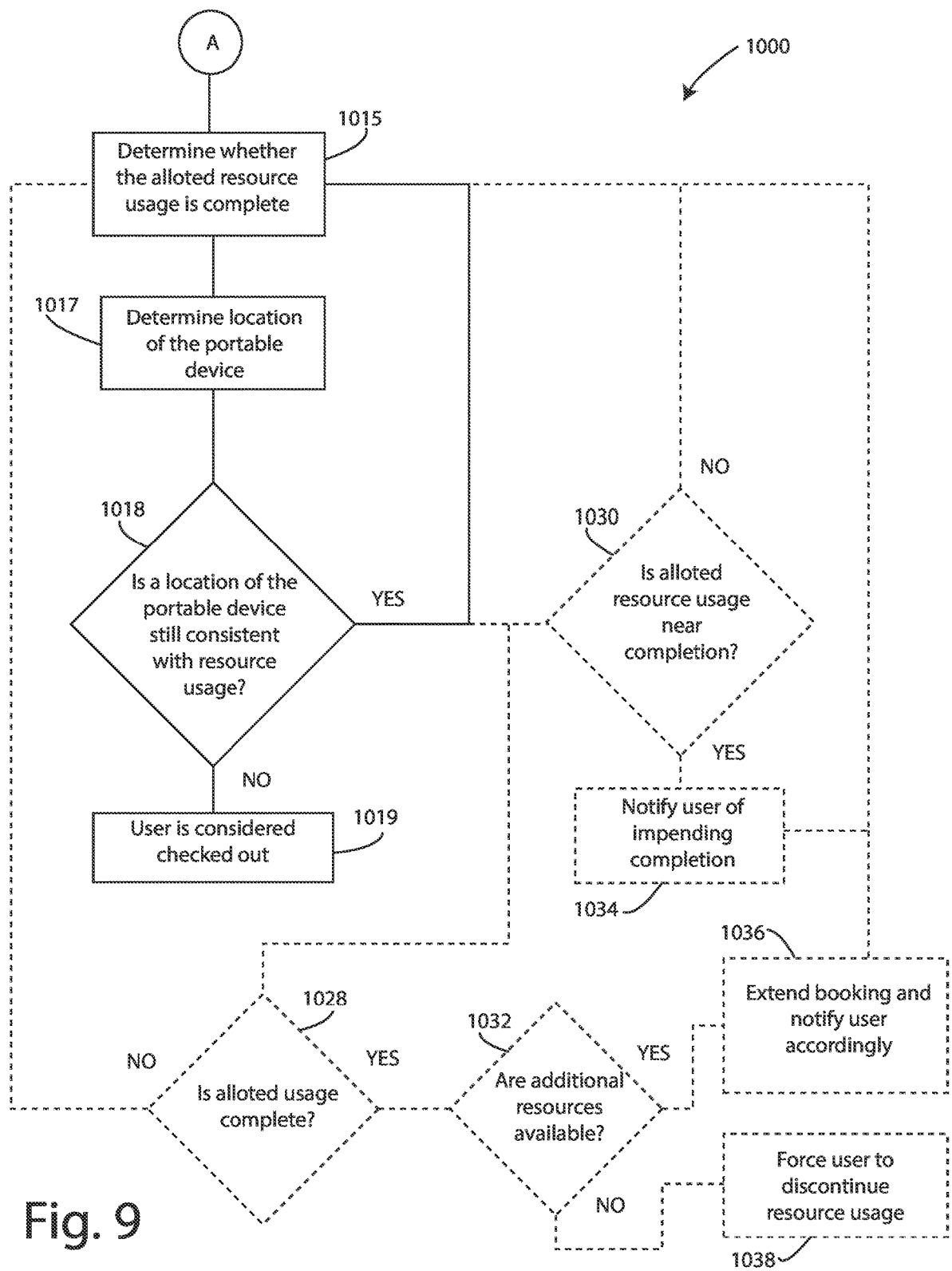
FIG. 9 shows part of the method of FIG. 8.

In one embodiment, the user may not discontinue use of an allocated resource after the allotted amount of resource usage has been completed. For instance, the user may not leave the bus or vehicle at the scheduled stop, or the user may not leave the hotel room at the scheduled time. In one embodiment, shown as optional in phantom lines in FIGS. 8-9, the system 200 may take steps to try to avoid over usage of the resource or book the user for extended usage of the resource, or a combination thereof. For instance, the system 200 may notify the user of impending booking completion, or re-book the user for extended usage of the resource, or a combination thereof. Steps 1028, 1030, 1032, 1034, 1036, 1038.

There are some cases where users may be distracted at their drop-off location and not exit the vehicle—or a user may purposefully not exit the vehicle, desiring, for example, to exit at a different (later) stop than originally booked. By using knowledge of the user's booking and location of the user relative to the vehicle (object 10) (e.g., that the user is inside the vehicle) and/or absolute location (e.g., that the vehicle is at the stop and that the vehicle near the user's current geographical location), along with the state of the vehicle, the system may notify the user that their ride has reached their drop-off stop and the user should exit the vehicle.

The system may continually notify the user until the user has exited the vehicle (or until the vehicle has left the stop). Steps 1030, 1034. In the scenario where a user does not exit the vehicle at their scheduled stop, the driver may be notified that an unexpected passenger is on-board. Alternatively or additionally, in the case where a passenger does not exit the vehicle, the system may automatically book the passenger for that stop when the vehicle departs the stop (or at some other event). Steps 1028, 1032, 1036. Alternatively or additionally, in the case where a passenger does not exit the vehicle, the system may adjust charges to the passenger for additional or less service usage and/or fees. In the event that a passenger has not exited the vehicle and the bookable stop is full, the driver may be able to easily identify which passenger has not exited the vehicle. In the event that a passenger has not exited the vehicle and the bookable stop is full, the passenger may be notified that the vehicle may not be booked, because it is full—and thus inform the passenger that they should exit the vehicle. Step 1038. Personal information may be associated with the user, such as a picture, and available to the driver in one embodiment to facilitate identification.

F. User has Entered the Wrong Vehicle

In one embodiment, a user may be confused at their pickup location and enter the wrong vehicle—or a user may purposefully enter the wrong vehicle, desiring, for example, to book a different vehicle (service) than originally booked. By using knowledge of the user's booking and location of the user relative to the vehicle (the object 10) (e.g., that the user is inside a vehicle they have not booked) and/or absolute location (e.g., that the vehicle is at the stop and that the vehicle is near the user's current geographical location), along with the state of the vehicle, the system may notify the user that they have entered the wrong vehicle.

In the scenario where a user does enter the wrong vehicle, the driver may be notified that an unexpected passenger is on-board. Alternatively or additionally, in the case where a passenger enters the wrong vehicle, the system may prompt the passenger to change their booking to the current vehicle (and/or select a new booking). Alternatively or additionally, in the case where a passenger enters the wrong vehicle and does not exit before the vehicle departs (or some other event), the system may automatically book the passenger for that stop. Alternatively or additionally, in the case where a passenger enters the wrong vehicle and does not exit before the vehicle departs, the system may adjust charges to the passenger for additional or less service usage and/or fees. In the event that a passenger has entered the vehicle and the bookable stop is full, the driver may be able to easily identify which passenger has entered the vehicle. In the event that a passenger has entered the vehicle and the bookable stop is full, the passenger may be notified that the vehicle may not be booked, because it is full—and thus inform the passenger that they should exit the vehicle. In such a case, the system may offer the user to book a different vehicle (service).

G. User has Entered a Vehicle without a Booking

In one embodiment, a user may desire to enter a vehicle without a booking (such as a walk-up user). By using knowledge of the user's booking (in this case, absence of a booking) and location of the user relative to the object (e.g., that the user is inside a vehicle they have not booked) and/or absolute location (e.g., that the vehicle is at the stop and that the vehicle is near the user's current geographical location), along with the state of the vehicle, the system may notify the user that the user has entered a vehicle that the user has not booked.

If a user does enter a vehicle without a booking, the driver may be notified that an unexpected passenger is on-board. Alternatively or additionally, in the case where a passenger enters a vehicle without a booking, the system may prompt the passenger to book the current vehicle (and select a destination [or create a booking from the current stop to the next stop automatically]). Alternatively or additionally, in the case where a passenger enters a vehicle without a booking and does not exit before the vehicle departs, the system may automatically book the passenger for that stop when the vehicle departs the stop (or at some other event). Alternatively or additionally, in the case where a passenger enters a vehicle without a booking and does not exit before the vehicle departs, the system may adjust charges to the passenger for additional or less service usage and/or fees. In the event that a passenger has entered the vehicle and the bookable stop is full, the driver may be able to easily identify which passenger has entered the vehicle. In the event that a passenger has entered the vehicle and the bookable stop is full, the passenger may be notified that the vehicle may not be booked, because it is full—and thus inform the passenger that they should exit the vehicle. In such a case, the system may offer the user to book a different vehicle (service).

H. User has Exited the Vehicle at the Wrong Stop

In one embodiment, a user may be distracted and/or confused and exit the vehicle at a wrong stop—or a user may purposefully exit the vehicle, desiring, for example, to get off at a different stop than originally booked. By using knowledge of the user's booking and location of the user relative to the vehicle (the object 10) (e.g., that the user is not inside the vehicle) and/or absolute location (e.g., that the vehicle is at the stop and that the vehicle is near the user's current geographical location), along with the state of the vehicle, the system may notify the user that user has exited the vehicle at the wrong stop and that the user should get back on the vehicle. The system may continually notify the user until they get back on the vehicle (or until the vehicle has left the stop). In the scenario where a user has exited the vehicle at the wrong stop, the driver may be notified that the passenger exited at the wrong stop. Alternatively or additionally, in the case where a passenger exits the vehicle at the wrong stop, the system may automatically check-out the passenger when the vehicle departs the stop (or at some other event). Alternatively or additionally, in the case where a passenger exits the vehicle at the wrong stop, the system may adjust charges to the passenger for additional or less service usage and/or fees. In such a case where the user has checked-out at a stop other than their booked destination, the system may offer the user to book a different vehicle (service).

I. Seat-Specific Bookings or Seat Detection

The above described system in accordance with one embodiment may book vehicles in their entirety (e.g., a vehicle has 9 seats, and so up to 9 users may book that vehicle); however, it may be possible to book a specific seat on a particular vehicle. Additionally, the system may provide notifications to passengers that sit in the wrong seat (based on a determined location of the passenger relative to the passenger's assigned seat). Additionally or alternatively, the system may allow users to sit at any seat, but localize users to the particular seat in which they are seated.

J. Personalization

With or without seat-specific bookings, the system may personalize the experience for a particular user or group of users based upon stored preferences associated with the particular person and/or group. When the system allows seat-specific bookings and/or localizes users to specific seats, a user's stored seat preferences (heat, cool, recline, lumbar support, etc.), audio preferences (personal audio service credentials, volume, favorite stations, etc.), video preferences (personal video streaming service credentials, favorite channels, etc.), and/or any other stored preferences/settings may automatically be applied to the seat in which the user is seated.

Additionally or alternatively, the system may use information about the user to deliver targeted or non-targeted advertising (e.g., audio, video, smell, product samples, etc.) to the seat in which the user is seated (e.g., using settings and/or preferences, pickup or drop off locations, identity [anonymized or not], or any other attributes). The system may additionally or alternatively, (e.g., such as when the system does not localize users to specific seats) use the collection of preferences for the group of users currently on the vehicle, or scheduled to be picked up soon, to determine appropriate settings for the vehicle (e.g., if all users like loud rap music, the system may play loud rap music, but if one user does not like to listen to music on their rides, then more soft, moderate music may be played instead; if all users like the temperature set at 73 F, then the thermostat may be set to 73 F, otherwise, the thermostat may be set to a value more appropriate to the group of users [e.g., average, maximum, minimum, etc.]; etc.). The system may set the determined settings automatically or they may be communicated to the driver to be set manually or authorized.

K. Privacy

A system in one embodiment may be configured to substantially protect identifying information pertaining to users and assets (e.g., objects) from being accessed by third party observers. This protection may substantially prevent tracking and theft. To enable discovery of an object as belonging to a service that a user would like to utilize (e.g., a ridesharing service, a rental or office to which they belong, etc.), an object may disclose identifying information about the object (e.g., vehicle) to the portable device. For example, to book a ride on a vehicle, or to determine if the user has entered the wrong vehicle, the system may determine relative to which vehicle the user is located (e.g., in which vehicle is the user located, etc.). To accomplish this, the object (e.g., vehicle) may broadcast or advertise information about itself, such as what service it is a part of or provides (e.g., that the vehicle is part of a ridesharing fleet, that the bus is part of a city's public mass transit system, that an ATM is part of a particular bank chain, etc.). These service broadcasts/advertisements by the object may be observable by the portable device, as well as potentially to others (third parties). A portable device may decide to respond (e.g., connect to, communicate with, further interrogate, etc.) to an object associated with a service the user has configured or authorized. Alternatively, or additionally, these roles may be reversed, where the portable device may advertise/broadcast information about itself and an object may respond to a portable device that is configured or authorized for the object.

After (or in response to) the portable device and object are connected, they may communicate additional identifying information, such as information specific to the object (e.g., a vehicle number, etc.) or portable device (e.g., a device identifier, location relative to the vehicle, etc.). In both cases, third parties may use such advertisements/broadcasts and/or subsequent communications to track or obtain information about the object and/or portable device (and thus, the user). These advertisements/broadcasts and subsequent communications may be performed in a manner that preserves the privacy of portable devices (users) and/or objects by preventing third parties from (a) tracking portable devices (users) and/or objects and (b) obtaining object and/or portable device identifying information. For example, a ride sharing service would like their vehicles to be discoverable and bookable by users based on proximity, but they do not want third party observers of system communications to be able to obtain identifying information about the specific vehicle or portable device involved in the interaction. In one embodiment, if the vehicle or service or object has been booked (e.g., there are no currently available bookings) or is out of service, advertisement or privacy violating communications may be discontinued. As an example, if a ride sharing service for a vehicle includes four open slots, advertisements from the vehicle may be enabled. Once all four slots have been filled, the vehicle may disable advertisements.

In one embodiment, the object (e.g., vehicle) advertises/broadcasts information about the service to which it belongs (e.g., a specific ridesharing, taxi, mass transit, etc.), wherein configured portable devices connect to and subsequently communicate with the object to obtain additional "private information" specific to the object (e.g., a vehicle number or other service-object-specific information) to book services or perform operations. In another embodiment, the portable device may also communicate "private information" to the object specific to the portable device. In these embodiments, the "private information" may be randomized and/or encrypted in a manner such that an observer cannot obtain the underlying information (payload) or associate any observed communication with a particular portable device and/or object (even across repeated communications events). For example, the "private information" may include inputs that change with each message (e.g., a timestamp or a counter), encryption keys and/or randomizers that change with each message or based upon time, may be or include random identifiers associated with contents provided by or residing within separate (e.g., cloud) services, or any combination thereof. The "private information" may be readable by the portable device in conjunction with another service, such as a cloud service (e.g., the portable device sends the received "private information" to a cloud service to obtain the underlying information—or the cloud service performs the operation with the received "private information" without providing information back to the portable device of the underlying information) and/or device-local service (e.g., the portable device decrypts or derandomizes the "portable information" based upon information at its disposal, such as information that has been previously received from an external cloud service, as part of an application bundle, private device identifiers or authorizations/credentials stored on the device), to obtain the underlying information.

In another embodiment, "private information" is not encrypted or randomized, but is exchanged only over a secured, authenticated communications link. In another embodiment, "private information" may be communicated as part of the advertisements/broadcasts themselves (i.e., not via communications after a connection is established).

In these ways, portable devices may obtain "private information" about objects as part of the service discovery process in a way that third party observers of system communications cannot obtain said "private information," or track said portable device and/or object, allowing portable devices to book services and/or perform operations without requiring the object and/or portable device to have any prior knowledge of one another (other than one's participation within a particular service and/or the owner's consent to participate with such a service).

IV. System and Method of Automatic Key/Authorization Generation and Assignment

A system and method of automatic key generation or authorization generation, or both, and assignment is provided. The system and method may be provided in conjunction with a secondary system 200 and a localization system 100 in accordance with one or more embodiments described herein.

In one embodiment, an "authorization" allows a particular user or device to access a particular service (a vehicle, or features of the vehicle) with particular rights (e.g., in a particular way, such as what sub-features, what security level, what medium, etc.) subject to particular constraints (e.g., during what time, how many times, etc.). "Authorizations" may be called "digital keys" in many systems. "Authorizations" are described, for instance, in U.S. application Ser. No. 15/796,180 entitled System and Method for Authenticating and Authorizing Devices to Smith et al., filed Oct. 27, 2017—the disclosure of which is hereby incorporated by reference in its entirety.

The system in accordance with one embodiment may automatically generate authorizations for a user, or a set of devices for a user, based upon the set of "schedules" for which the user is the driver (i.e., the system may generate an authorization for the user to access the assigned vehicle for each schedule).

Additionally or alternatively, the system may automatically generate authorizations for a user, or a set of devices for a user, based upon the user's bookings (i.e., the vehicles on which, and when, the user is a passenger) (i.e., the system generates an authorization for the user to access the booked vehicle for each booking).

The starting and ending times of an authorization may be determined dynamically using a computed schedule/route execution time and/or estimated travel time(s) for drivers/passengers (users) to/from current/starting/destination vehicle locations (including travel time for users to reach the vehicle, travel time to move the vehicle from the current location to the start of the route, travel time to move the vehicle from the end of the route to a different destination location, and so on). Alternatively, the starting and ending times may be statically determined (e.g., for an entire day). The computed schedule/route execution time (e.g., the duration of the schedule/route) and/or stop estimated arrival times (e.g., the time a vehicle will arrive at a particular stop) may be calculated using: travel time between stops (static or dynamically computed via a real-time mapping/traffic system, such as Google Maps, Waze, Apple Maps, etc.), stop wait time (i.e., amount of time to wait for passengers at a stop, which might be static, dynamic, and may be the same for all stops or vary for each stop), weather conditions, traffic conditions, number of passengers, or other attributes that may be pertinent. Computed schedule/route execution times and/or stop estimated arrival times may be computed when the schedule is created or assigned, at some predetermined time before the schedule begins, or dynamically, or any combination thereof. The system may update authorizations based upon computed schedule/route execution times and/or stop estimated arrival times. In one embodiment, the schedule/route execution time may be determined dynamically when the schedule/route is instantiated (i.e., a particular schedule is created for the route), at schedule start time, and/or at some predetermined time prior to the schedule start time.

To improve efficiency, user experience, and system performance, the system may adjust and/or merge the set of generated authorizations by applying a pre-authorization offset and/or post-authorization offset and/or maximum authorization gap threshold and/or other offsets and/or thresholds. The pre-authorization offset may be defined as an amount of time and/or number of accesses for which the authorization is considered valid prior to the determined start time of the authorization (e.g., a driver should be able to access the vehicle up to 30 minutes prior to their scheduled start time, a passenger should be able to access the vehicle up to 5 minutes prior to their booking, etc.).

The post-authorization offset may be defined as an amount of time and/or number of accesses for which the authorization is considered valid after the determined end time of the authorization (e.g., a driver should be able to access the vehicle up to 30 minutes after their scheduled end time, a passenger should be able to access the vehicle up to 5 minutes after their booking, etc.).

The maximum authorization gap threshold may be defined as a threshold that defines the maximum time separation (gap) between the ending and starting times of consecutive authorizations (in time) after which the consecutive authorizations may not be merged (e.g., if the threshold is 30 minutes, two authorizations that are 15 minutes apart [authorization A ends at 10:15 and authorization B begins at 10:30] may be merged into one authorization, but two authorizations that are 1 hour apart may not be merged). The offsets and/or thresholds may be statically determined or dynamically determined. In an example system, the pre- and post-authorization offsets, and the maximum authorization gap threshold, are all set to 30 minutes. Another example system is one where the offsets and/or thresholds may be set differently for each user according to the user's history (years of service, number of rides taken, etc.), role within the system (driver, supervising driver, etc.), travel time between schedules, and/or other criteria.

One example of a combined adjustment and merging algorithm using a pre-authorization offset, post-authorization offset, and maximum authorization gap threshold is provided in accordance with the following steps:

1) For a given vehicle and user, determine the maximum set of authorizations based upon the set of schedules and bookings.
2) For each authorization, apply the pre-authorization and post-authorization offset (i.e., subtract the pre-authorization offset from the start time and add the post-authorization offset to the end time).
3) Order the set from 2 ascending by start time (e.g., Aug. 17, 2018 10:15 AM, then Aug. 17, 2018 10:30 AM, then Aug. 17, 2018 11:00 AM, etc.).
4) For each consecutive pair of authorizations having the same rights (i) and (j, or i+1), if the difference between the start and end time times of the two (i.e., [j] start time−[i] end time) is less than (or less than or equal to) the maximum authorization gap threshold, merge [i] and [j] by setting the end time of [i] to the end time of

[j] and then deleting [j] from the set (or alternatively, setting the start time of [j] to the start time of [i] and deleting [i]).

Given the above algorithm, the following set of authorizations for the same vehicle and user, with the same set of access rights, may be merged into:

From (1), the resultant set is: {Aug. 18, 2017 10:15 AM to 10:35 AM, Aug. 17, 2018 10:30 AM to 10:50 AM, Aug. 17, 2018 11:00 AM to 11:20 AM, Aug. 17, 2018 11:15 AM to 11:35 AM}.

From (2), given offsets and thresholds each 30 minutes, the resultant set is: {Aug. 17, 2018 9:45 AM to 11:05 AM, Aug. 17, 2018 10:00 AM to 11:20 AM, Aug. 17, 2018 10:30 AM to 11:50 AM, Aug. 17, 2018 10:45 AM to 12:05 PM}.

From (3), the set is already ordered.

From (4), the resultant set is just: {Aug. 17, 2018 9:45 AM to 12:05 PM}.

Iteration 1: Aug. 17, 2018 10:00 AM—Aug. 17, 2018 11:05 AM is less than the maximum authorization gap threshold, so merge and delete→Aug. 17, 2018 9:45 AM to 11:20 AM.

Iteration 2: Aug. 17, 2018 10:30 AM—Aug. 17, 2018 11:20 AM is less than the maximum authorization gap threshold, so merge and delete→Aug. 17, 2018 9:45 AM to 11:50 AM.

Iteration 3: Aug. 17, 2018 10:45 AM—Aug. 17, 2018 11:50 AM is less than the maximum authorization gap threshold, so merge and delete→Aug. 17, 2018 9:45 AM to 12:05 PM.

The system may also support "manual" authorizations—authorizations created by some means other than "automatically" via the set of "schedules" and "bookings" as described above (such as a Fleet Manager). The system may mark "automatic" authorizations separately from "manual" authorizations, so that whenever "automatic" authorizations need to be updated, the existing set may easily be discarded and recreated without affecting "manual" authorizations.

V. System and Method for Assisting Biometric Recognition Systems

The system in accordance with one embodiment, including the localization system 100 and secondary system 200, may rely upon a mobile device with sufficient communications capabilities to interact with the system (app installed, BLE enabled, cellular enabled, etc.). As a result, passive biometric or other biometric systems may be used in conjunction with such systems to identify users and track their location. In many cases, biometrics on their own, and especially passive biometrics (such as facial recognition), tend to be error prone across large sets of possible classifications (users), and especially in challenging environments (like users on-boarding and off-boarding a vehicle rapidly).

The identity information provided by a system in accordance with one embodiment may be used to help such systems more accurately (increase confidence) classify users—either as an additional security measure for users with capable mobile devices or via eliminating users with such mobile devices from the list of users the biometric system must process (or by altering how such users are processed). In the case where a biometric system is used to authenticate users as an additional security measure, usage of the security information (such as the security information described in U.S. application Ser. No. 15/796,180 entitled System and Method for Authenticating and Authorizing Devices to Smith et al., filed Oct. 27, 2017—the disclosure of which is hereby incorporated by reference in its entirety, or as provided by any alternate identity/authentication system) may additionally increase the speed and accuracy of such systems.

In the case where a user is a passenger to a vehicle, authentication based on the security information obtained from the portable device may allow a driver of the vehicle to proceed with confidence that the user does not need to be manually verified.

VI. System and Method for Reporting Occupancy Information

In one embodiment of the system 200, a Telematics Control Unit (e.g., a cellular modem with a processor attached) may interact with the object device 50 (e.g., a BLE-based localization system) to obtain information about the set of connected/detected mobile devices (e.g., for each mobile device an associated mobile device identifier, user identifier, zone, current determined location, any other pertinent information regarding the mobile device and/or its user, or any combination thereof). The TCU may send this occupancy information to other systems and/or services (such as a secondary system, the object, a cloud service associated with the localization system, any other service or system, or any combination thereof) whenever it changes, as well as periodically (at a predetermined interval, currently set at every 5 seconds), or when queried, for use by other systems, services, and algorithms. In one system, the occupancy information may be anonymized; alternatively the occupancy information may not be anonymized. This occupancy information may be used by the cloud to determine check-in/check-out state, and to generate a report used by a mobile device to perform an appropriate UI action (e.g., inform the user that they are checked in, checked out, that they are on the wrong vehicle, etc.). This occupancy information may also be used in cases where it is necessary to know the current or historical set of occupants of a particular vehicle (or users of a particular service), such as during an emergency.

In one embodiment, the telematics control unit may be configured to substantially protect identifying information pertaining to the object device and/or the connected/detected mobile devices. Protection schemes, such as those described herein, for protecting private information or information considered confidential may be provided in conjunction with communications to the other systems and/or services (such as a secondary system, the object, a cloud service associated with the localization system, any other service or system, or any combination thereof). It is to be understood that such protections may be provided for one system or service and absent from another system or service.

VII. System and Method for Adjusting Telematics Reporting Rate

In one embodiment, the update rate and/or responsiveness of embedded systems may be updated based upon the detected presence of users, authorized or not, inside or outside (in different zones). For example, GPS updates may not be sent every second when the vehicle is in park and there are no users detected. There are a large number of other telematics where adjusting the reporting rate may be based upon whether there were users near or in the vehicle.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A system for tracking associations between two or more users and one or more locations of an object, said system comprising:
    a fixed position device disposed in a fixed position relative to the object, the fixed position device including an antenna and configured to communicate wirelessly with a first portable device via a first communication link;
    a locator processor configured to determine first device location information about the first portable device relative to the object, the locator processor configured to determine second device location information about a second portable device relative to the object, the locator processor configured to determine the first device location information about the first portable device based on a signal characteristic of communications wirelessly transmitted from the first portable device, the locator processor configured to determine the second device location information about the second portable device based on a signal characteristic of communications wirelessly transmitted from the second portable device;
    a controller disposed on the object, the controller being configured to authenticate an identity of the first portable device based on security information transmitted from the first portable device and received by an antenna disposed on the object;
    a tracking processor configured to store a first association between a first user and a first location of the object, the tracking processor configured to store a second association between a second user and a third location of the object;
    the tracking processor configured to determine a status of the first user is at or proximal to the first location based on a) authentication of the identity of the first portable device by the controller based on the security information received from the first portable device and b) said first device location information being indicative that the first user is proximal to or at the first location of the object;
    the tracking processor configured to determine a status of the second user is at or proximal to the third location of the object based on a) authentication of the identity of the second portable device by the controller based on the security information received from the second portable device and b) the second device location information about the second portable device being indicative that the second user is proximal to or at the third location of the object;
    wherein a status of the first association is changed automatically based on a determination that the object is located at a first object location and the first user is located at or proximal to the first location of the object;
    wherein the status of the second user is changed automatically based on the second device location information being indicative that the second user is at a fourth location relative to the object; and
    wherein the status of the first association is changed automatically based on a determination that the object is located at a second object location and the user is not detected at the second object location.

2. The system of claim 1 wherein:
    the tracking processor includes a plurality of remotely distributed processors;
    the tracking processor is configured to store tracking data for one or more locations of the object;
    the tracking processor is configured to store information associated with the first user for a set of locations of the object that includes at least one of the one or more locations of the object; and
    the tracking processor is configured to determine the status of the first user for at least one of said set of locations of the object based on the first device location information determined by the locator processor.

3. The system of claim 2 wherein:
    the object is a vehicle;
    a first one of the at least one of the locations of the object of the set is associated with the first location of the vehicle; and
    a second one of the at least one of the locations of the object of the set is associated with a second location of the vehicle.

4. The system of claim 3 wherein:
    the controller disposed on the object is configured to detect a status of the object indicating whether the object is moving or not;
    the system maintains the first association between the first user and the first location of the object based on a determination that the object is moving after the first association is made and the object is not located at the second object location; and
    the system changes the first association between the first user and the first location of the object based on a determination that the object is located at the second object location and the first user is not detected at the second object location when the object is not moving.

5. The system of claim 4 wherein:
    the first location of the object is a transport location inside the vehicle;

the status of the first association for the first user is changed automatically based on a determination that the first user is located in an interior of the vehicle; and the second location of the vehicle is an exterior of the vehicle.

6. The system of claim 1 wherein the first and third locations of the object are utilized simultaneously by the first and second users, such that usage of the first and third locations overlaps in time.

7. The system of claim 6 wherein the first and third locations are shareable by the first and second users.

8. The system of claim 7 wherein:

the first location of the object corresponds to a first transport location; and the third location of the object corresponds to a second transport location different from the first transport location.

9. The system of claim 8 wherein the locator processor is operable to determine the first portable device is located proximal or at the first transport location, and wherein the locator processor is operable to determine the second portable device is located proximal to or at the second transport location.

10. A method for tracking associations between two or more users and one or more locations of an object, said method comprising:

determining first device location information about a first portable device relative to the object based on a signal characteristic of communications wirelessly transmitted from the first portable device;

determining second device location information about a second portable device relative to the object based on a signal characteristic of communications wirelessly transmitted from the second portable device;

authenticating an identity of the first portable device based on security information transmitted from the first portable device and received by an antenna disposed on the object;

storing a first association between a first user and a first location of the object;

storing a second association between a second user and a third location of the object;

determining a status of the first user is at or proximal to the first location based on a) authentication of the identity of the first portable device based on the security information received from the first portable device and b) said first device location information being indicative that the first user is proximal to or at the first location of the object;

determining a status of the second user is at or proximal to the third location of the object based on a) authentication of the identity of the second portable device based on the security information received from the second portable device and b) the second device location information about the second portable device being indicative that the second user is proximal to or at the third location;

automatically changing a status of the first association based on a determination that the object is located at a first object location and the first user is located at or proximal to the first location of the object;

automatically changing a status of the first association based on a determination that the object is located at a second object location and the user is not detected at the second object location; and changing the status of the second user based on the second device location information being indicative that the second user is at a fourth location relative to the object.

11. The method of claim 10 wherein:

storing tracking data for one or more locations of the object in at least one of a plurality of remotely distributed processors;

storing information associated with the first user for a set of locations of the object that includes at least one of the one or more locations of the object; and determining the status of the first user for at least one of said set of locations of the object based on the first device location information.

12. The method of claim 11 wherein:

the object is a vehicle;

a first one of the at least one of locations of the object of the set is associated with the first location of the vehicle; and a second one of the at least one of the locations of the object of the set is associated with a second location of the vehicle.

13. The method of claim 12 wherein:

detecting a status of the object indicating whether the object is moving or not;

maintaining the first association between the first user and the first location of the object based on a determination that the object is moving after the first association is made and the object is not located at the second object location; and automatically changing the first association between the first user and the first location of the object based on a determination that the object is located at a second object location and the first user is not detected at the second object location when the object is not moving.

14. The method of claim 13 wherein:

the first location of the object is a transport location inside the vehicle;

the status of the first association for the first user is changed automatically based on a determination that the first user is located in an interior of the vehicle; and the second location of the vehicle is an exterior of the vehicle.

15. The method of claim 10 comprising simultaneously utilizing the first and third locations of the object by the first and second users, such that usage of the first and third locations overlaps in time.

16. The method of claim 15 wherein the first and third locations are shareable by the first and second users.

17. The method of claim 16 wherein:

the first location of the object corresponds to a first transport location; and the third location of the object corresponds to a second transport location different from the first transport location.

18. The method of claim 17 comprising:

determining the first portable device is located proximal or at the first transport location; and determining the second portable device is located proximal to or at the second transport location.

* * * * *